US008086675B2

(12) United States Patent
Usher

(10) Patent No.: US 8,086,675 B2
(45) Date of Patent: Dec. 27, 2011

(54) GENERATING A FINGERPRINT OF A BIT SEQUENCE

(75) Inventor: Mark Usher, Goettingen (DE)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 12/119,842

(22) Filed: May 13, 2008

(65) Prior Publication Data

US 2009/0030994 A1    Jan. 29, 2009

(30) Foreign Application Priority Data

Jul. 12, 2007    (EP) .................................... 07112332

(51) Int. Cl.
*G06F 15/16*    (2006.01)
(52) U.S. Cl. ...................................................... 709/206
(58) Field of Classification Search .................. 709/206
See application file for complete search history.

(56) References Cited

U.S. PATENT DOCUMENTS

| 2005/0216564 | A1  | 9/2005 | Myers et al. |        |
|--------------|-----|--------|--------------|--------|
| 2006/0095521 | A1  | 5/2006 | Patinkin     |        |
| 2006/0184479 | A1* | 8/2006 | Levine       | 706/25 |
| 2007/0147568 | A1  | 6/2007 | Harris et al.|        |

FOREIGN PATENT DOCUMENTS
WO    WO 2004/068288 A2    8/2004

OTHER PUBLICATIONS

Color-Based Descriptors for Image Fingerprinting, IEE Transaction on Multimead, vol. 9 No. 4, Aug. 2006.

* cited by examiner

*Primary Examiner* — Jeffrey Pwu
*Assistant Examiner* — Farhad Ali
(74) *Attorney, Agent, or Firm* — George R. McGuire; Blaine T. Bettinger; Bond Schoeneck & King

(57) ABSTRACT

A method of generating a fingerprint of a bit sequence includes determining a relative occurrence frequency of each bit combination of a set of bit combinations in the bit sequence, wherein the set of bit combinations comprises all possible non-redundant sub-sequences of bits having at least one bit and at most a preset maximal number of bits. The method further includes determining for each bit combination of the set of bit combinations a difference value between the relative occurrence frequency of the bit combination and a random occurrence frequency, the random occurrence frequency relating to the expected random occurrence of the bit combination in the bit sequence. Moreover, the method includes allocating a set of bins, each bin of the set of bins being associated with a predetermined interval of difference values, each bin further relating to a bin value. The difference value of each bit combination is assigned to the bin which is associated with the interval of difference values in which the difference value of the corresponding bit combination lies. A fingerprint of the bit sequence is generated by use of the bin values of the bins to which a difference value has been assigned.

18 Claims, 6 Drawing Sheets

GENERATING A FINGERPRINT OF A BIT SEQUENCE

REFERENCE TO RELATED APPLICATIONS

This application claims priority to European Application No. 07112332.7 filed Jul. 12, 2007, which is hereby incorporated by reference.

FIELD OF THE INVENTION

The invention relates to a method of generating a fingerprint of a bit sequence, and more particularly to a data processing system for generating the fingerprint of a bit sequence.

BACKGROUND

Digital data relates in general to a sequence of bits. A fingerprint derived from the digital data can therefore be regarded as a unique or nearly unique description of the digital data. Such a fingerprint can for example be derived from the digital data by applying a hash function to the digital data, whereby the fingerprint relates to the received hash value which provides a unique description of the input data.

A fingerprint derived from a bit sequence of digital data can be used in many applications, e.g., for comparing the determined fingerprint with other fingerprints that are stored, for example, in a database. If the fingerprint matches one of the fingerprints of the database, then both fingerprints have been derived from the same digital data.

There are however applications, where simple hash techniques for determining a fingerprint of a bit sequence of digital data are rarely effective. Spam emails, for example, might contain one or more embedded images, whereby the spam message is displayed as text in the embedded images. The terms "spam" or "spam email" relate to unsolicited communication and in particular to unsolicited commercial emails. As most spam images contain random variations and distortions and thus produce a unique hash code for each image, hash techniques to identify spam email are barely applicable in this case.

U.S. patent application Ser. No. 2005/0216564 A1 discloses a method and apparatus for analysis of emails that contain images, e.g., in order to determine whether or not a received electronic mail is a spam email. One or more regions of an image embedded in the email are detected and pre-processing techniques are applied to locate regions, e.g., blocks or lines, of text in the images that may be distorted. The regions of text are then analyzed in order to determine whether the content of the text indicates that the received email is a spam email. Specialized extraction and rectification of embedded text followed by optical character recognition processing is applied to the regions of text to extract the content therefrom. Alternatively, text recognition or shape-matching processing is applied to detect the presence or absence of spam-indicative words from the regions of text. According to a further alternative described in the above mentioned document, other attributes of extracted text regions, such as size, location, color and complexity are used to build evidence for or against the presence of spam.

The method disclosed in the above mentioned document is however not suitable for an email processing environment, where high email throughput is required. The reason is that the employed character recognition techniques, also referred to as OCR techniques, are computationally very expensive to perform and are therefore not advantageously applicable to email processing environments. Additionally, OCR analysis is relatively easy to circumvent, for example by altering the size and style of the text in the embedded image, or by writing the text in irregular patterns rather than straight lines.

More techniques for analyzing image data exist that make use of color and spatial information contained in the image to extract a set of features that can be compared against a database of stored image features.

For example, Gavrielides et al. describe in the document, "Color-Based Descriptors For Image Fingerprinting," IEEE transactions on multimedia, volume 8, no. 4, August 2006, pages 740-748, an image fingerprinting system which aims to extract unique and robust image descriptors. The image fingerprinting system consists mainly of two parts: fingerprint extraction and fingerprint matching. In the first part, a descriptor is extracted from each image and is used to create an indexed database. In the second part, the index for an image (query image) is compared to the indices of the rest of the database (target images), using some kind of similarity measure to determine close matches between the query image and target images. The fingerprint extraction procedure involves the quantization of the image colors and the calculation of color histograms based on the resulting colors.

The more sophisticated techniques often involve image analysis techniques too expensive to perform in an email processing environment which is supposed to have a high email throughput. Additionally, these techniques are liable to produce mis-classification rates considered high in an email filtering environment.

It is one object of the invention to provide an improved method of generating a fingerprint from a bit sequence which might relate to a bit sequence derived from an embedded image of an email. It is a further object of the invention to provide an improved system for generating such a fingerprint.

SUMMARY OF THE INVENTION

According to a first aspect of the invention, there is provided a method of generating a fingerprint of a bit sequence. In accordance with an embodiment of the invention, the method includes determining a relative occurrence frequency of each bit combination of a set of bit combinations in the bit sequence. The set of bit combinations includes all possible non-redundant sub-sequences of bits having at least one bit and at most a preset maximal number of bits. In a further step, a difference value between the relative occurrence frequency of a bit combination of the set of bit combinations and a random occurrence frequency is determined for each bit combination. The random occurrence frequency hereby relates to the expected random occurrence of the bit combination for which the corresponding relative occurrence frequency is used to determine the difference value. Furthermore, a set of bins is allocated, wherein each bin of the set of bins is associated with a pre-given interval of difference values, and wherein each bin further relates to a bin value. According to a further step of the method in accordance with the invention, the difference value of each bit combination is assigned to the bin which is associated with the interval of difference values in which the difference value of the corresponding bit combination lies. Then, the fingerprint of the bit sequence is generated by use of the bin values of the bins to which a difference value has been assigned.

The term bit sequence hereby relates to digital data represented by a sequence of '0' and '1'. The set of bit combinations comprises a plurality of sub-sequences of bits with at least one bit and at most a preset number of bits. For example, if the preset maximum number of bits is taken to be 3, then the set of bit combinations comprises the following sub-sequences of bits: 1, 01, 10, 11, 001, 010, 100, 011, 101, 110, and 111. The set of bit combinations does not comprise the sub-sequences of bit combinations: 0, 00, and 000 as they are redundant.

For each bit combination of the set of bit combinations, the relative occurrence frequency of the bit combination is determined and compared with the expected random occurrence frequency for the bit combination in the bit sequence. For example, the occurrence of the bit combination '1' in a bit sequence can be determined by dividing the number of times the bit '1' occurs in the bit sequence by the number of bits in the bit sequence. The probability that N bits of the bit sequence represent a specific bit combination is simply:

$$P(N)=2^{-N}.$$

Thus, the random occurrence frequency of a bit combination having N bits is taken to be P(N).

The difference value between the relative occurrence frequency of a bit combination and the random occurrence frequency determined for the bit combination by use of the formula given above is then assigned to the corresponding bin in which the difference value of the corresponding bit combination lies. The bins of the set of bins may be arranged equidistant and/or symmetrically around the bin into which P(N) falls. Although bin allocation is simpler to perform if the bins are equidistant with respect to each other, non-equidistant bins could also be used and could be advantageous for generating fingerprints of certain bit sequences.

The method in accordance with the invention is particularly advantageous as the determination of the relative occurrence frequency of the bit combinations of the set of bit combinations with respect to the bit sequence can be determined, by use of a corresponding computer system, very quickly. As this step is the step which takes the most processing time, the overall performance of a computer system will mainly be influenced by this step. As mentioned before, nevertheless, the step can be performed very quickly and hence, the load put on the system when generating the digital fingerprint is not dramatic.

A first bit sequence might for example relate to a first embedded image of a first spam email message and a second bit sequence might for example relate to a second embedded image of a second spam email message. The first and second embedded images might contain texts. The text of the first embedded image might differ slightly from the text in the second embedded image, e.g. in design aspects. Thus, the first and second bit sequence will be similar, but there will be nevertheless a difference. A hash function applied to the first and second bit sequences will generate two different fingerprints. A spam filter with a database in which the fingerprint of the second embedded image determined by a hash function is stored will therefore not be able to identify the first (incoming) message as spam by checking the fingerprint of the first embedded image determined by use of the hash function against the database.

In contrast, the fingerprints determined according to the method in accordance with the invention from the first and second bit sequences are very likely to be identical even if the first and second sequences are not identical but similar. The method in accordance with the invention is therefore particularly advantageous as it can be employed in spam filters of email processing systems for identifying reoccurring images in spam email messages even if the reoccurring images differ slightly from each other.

In accordance with another embodiment of the invention, the method comprises the step of determining a particular order for the bit combinations of the set of bit combinations, wherein the bin values reflect the particular order of the bit combinations in the fingerprint. The bit combinations are arranged in a particular order.

For example, if the preset maximum number of bits is taken to be 2, then the set of bit combinations can be arranged in the following order: 1, 01, 10, 11. Further, the set of bins might comprise 5 bins. A bin relates to the bin value of '0', a bin relates to the bin value of '1', a bin relates to the bin value of '2', a bin relates to the bin value of '3', and a bin relates to the bin value of '4'. The difference value determined for the bit combination '1' might be assigned to the bin with bin value '1'. The difference value determined for the bit combination '01' might be assigned to the bin with bin value '3'. The difference value determined for the bit combination '10' might be assigned to the bin with bin value '5', and the difference value determined for the bit combination '11' might be assigned to the bin with bin value '4'. As the particular order of the bit combinations is reflected in the fingerprint, the fingerprint can for example be 1354, wherein the fingerprint is given to be a concatenation of the bin values according to the ordering of the corresponding bit combinations.

In accordance with yet another embodiment of the invention, the method comprises determining an identifier from the fingerprint, wherein the identifier relates to the hash value of a hash function applied to the fingerprint. As the fingerprint is generated by use of the bin values, it can contain a variable number of bin values depending on the maximal number of bits of the bit combinations in the set of bit combinations. A hash function, which uses for example the MD 5 hashing algorithm, is characterized in that the hash value will always have the same length independent of the input of the hash function. As the identifier of the fingerprint is determined by use of a hash function, it is therefore ensured that all fingerprints determined from different input sequences and/or by use of different bit combinations have the same length.

In accordance with still another embodiment of the invention, the method comprises receiving an input bit sequence and determining the bit sequence from the input bit sequence, wherein the bit sequence is a sub-sequence of the input bit sequence. The bit sequence, for which the fingerprint is generated, therefore represents only a sub-sequence of a longer input bit sequence. In particular, the bits of the bit sequence are selected from the input bit sequence so that they represent the 'important information' comprised in the input bit sequence and that allows generating a representative fingerprint of the input bit sequence.

The method in accordance with the invention is therefore particularly advantageous as a sub-sequence of a longer input bit sequence can be employed to generate a representative fingerprint for the input bit sequence. Due to the usage of the shorter sub-sequence of the input bit sequence, the processing time for determining the fingerprint is reduced.

In accordance with a further embodiment of the invention, the input bit sequence relates to a sequence of bytes, wherein the bit sequence comprises the first n bits of each byte of the sequence of bytes, wherein the first n bits of a first byte of the sequence of bytes are preceded by the first n bits of the byte preceding the first byte and succeeded by the first n bits of the bytes succeeding the first byte in the sequence of bytes, and wherein n is a pre-given number between 1 and 8, inclusively.

In accordance with another embodiment of the invention, the input bit sequence is received in a first file format and the method comprises accessing a first database, wherein the first database comprises information whether the input bit sequence in the first file format is to be transformed into a second file format for determining the fingerprint of the input bit sequence. In case it is indicated in the first database that a file having a first file format should be transformed into a second file format, the received input sequence is transformed from the first file format into the second file format.

In accordance with a further embodiment of the invention, the input bit sequence is further scanned for meta-data and the meta-data is used for generating the fingerprint. The meta-data can for example be employed for setting the maximal number of bits or the number of bins of the set of bins. The meta-data can for example relate to the data format in which the input bit sequence is received. Depending on the file format, the maximal number of bits for the bit combinations is specified. The input bit sequence might also relate to an image. The meta-data might then specify whether the image is a black and white image or a color image. Color images comprise a higher degree of information and hence a lower maximal number of bits will be set for the bit combinations in order to determine the fingerprint of a color image than for a black and white image. The usage of the meta-data is therefore particularly advantageous as parameters employed for determining a fingerprint of a bit sequence such as the maximal number of bits can be set such that the determination of the fingerprint can be carried out as quickly as possible but without "loosing" relevant information comprised in the bit sequence.

In accordance with still another embodiment of the invention, the method comprises receiving an email and scanning the email for embedded images, wherein each embedded image relates to an input bit sequence, wherein a bit sequence is determined for each input bit sequence. For each bit sequence, a fingerprint is then determined according to the embodiments described above.

In accordance with another embodiment of the invention, the method comprises accessing a second database which comprises fingerprints of bit sequences determined from input bit sequences relating to spam embedded images. Further, each fingerprint which has been determined from a bit sequence that relates to an embedded image in the email is compared with the fingerprints of the second database. The email is blocked or alternatively it is indicated that the email is a spam email, if at least one fingerprint of a bit sequence that relates to an embedded image in the email matches a fingerprint in the second database. The second database therefore serves as a repository for fingerprints of known images of spam emails. The fingerprint determined by processing the bit sequence that is determined from an embedded image in the received email can then be used to check if the email is spam email.

The method in accordance with the invention can also be applied to scan complete emails or attachments of the emails in order to identify spam messages in these emails. For example, spam messages are also known to be distributed in PDF-files attached to email messages. For each PDF attachment of an email, a fingerprint can be determined by use of the method in accordance with the invention and checked against a database of fingerprints of known spam PDF attachments in order to classify the PDF attachment as spam message or not.

In accordance with a further embodiment of the invention, the method further comprises transforming each embedded image of the email into the RGB format and determining a first bit sequence from each embedded image, wherein the first bit sequence comprises the red channel data according to the RGB format of the corresponding embedded image. Furthermore, a second bit sequence is determined from each embedded image, wherein the second bit sequence comprises the green channel data according to the RGB format of the corresponding embedded image. Moreover, a third bit sequence is determined from each embedded image, wherein the third bit sequence comprises the blue channel data according to the RGB format of the corresponding embedded image. The first, second and third bit sequences are then employed for the determination of a first, second, and third fingerprint, respectively. Each of these fingerprints is determined separately according to the method in accordance with the invention. Then, a so called combined fingerprint is determined by concatenating the first, second and third fingerprint, wherein the combined fingerprint is used for a comparison with the fingerprints of the second database.

In accordance with an embodiment of the invention, the method in accordance with the invention further comprises appending meta-data relating to the bit sequence to the fingerprint and/or the combined fingerprint generated from a bit sequence.

The method in accordance with the invention extracts statistical information, the relative occurrence frequencies of the bit combinations, from a bit sequence in order to generate the fingerprint of the bit sequence. For different bit sequences, the identical fingerprint might therefore be generated. This is particularly advantageous when employing the method in accordance with the invention in order to identify spam email messages with embedded images as described above. However, embedded images of non-spam messages might be identified as spam if they are somehow similar to known spam images. In order to reduce the amount of false detection of spam, the meta-data can be according to this embodiment of the invention employed. The meta-data might for example relate to the aspect ratio of a first embedded image of a received email for which the fingerprint is determined as described above. The fingerprint of the first embedded image might further be identical to the fingerprint of a second embedded image which is known to be spam and stored in a database. The aspect ratios of both embedded images might however be different. If the fingerprint of the first embedded image with the appended aspect ratio of the first embedded image is compared with the fingerprint of the second embedded image with the appended aspect ratio of the second embedded image, then there will be a mismatch and the first image will not be detected as spam and the corresponding email message will therefore not be filtered out.

In accordance with an embodiment of the invention, the number of bins in the set of bins is adjusted according to meta-data of the bit sequence. For example, for the generation of fingerprints of bit sequences that relate to black and white images, a different number of bins might be employed than for the generation of fingerprints of bit sequences that relate to color images.

According to a second aspect of the invention, there is provided a computer program product. The instructions are adapted, when executed on a computer, to cause the computer to perform steps of the method in accordance with the invention.

According to a third aspect of the invention, there is provided a data processing system for generating a fingerprint of a bit sequence.

In accordance with an embodiment of the invention, the data processing system comprises means for performing steps of the method in accordance with the invention.

In accordance with an embodiment of the invention, the data processing system relates to an email processing environment, wherein the data processing system is in particular adapted to scan received emails for embedded images and to determine whether or not these emails comprise spam messages within the embedded images.

According to a fourth aspect of the invention, there is provided a network that comprises at least an email server and a plurality of email clients. In accordance with an embodiment of the invention, the email server is adapted to forward received emails to one or more clients of the plurality of clients and the email server is adapted to perform the method in accordance with the invention in order to scan received emails for embedded spam images.

BRIEF DESCRIPTION OF THE DRAWINGS

In the following embodiments of the invention will be described in greater detail by way of example only making reference to the drawings in which.

DETAILED DESCRIPTION

Figure 1:
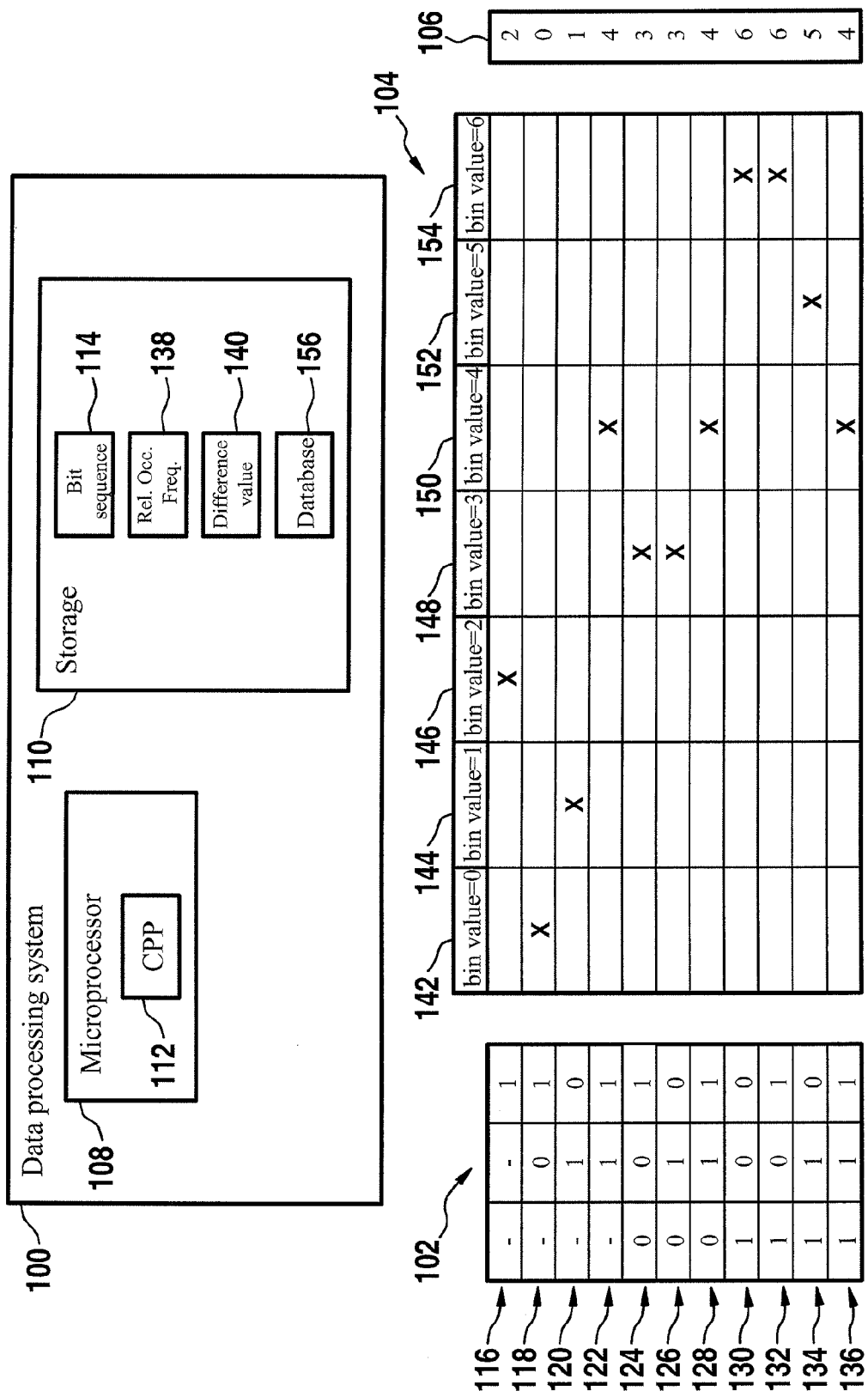
FIG. 1 shows a block diagram of a data processing system and tables illustrating how a fingerprint of a bit sequence is determined by the data processing system.

FIG. 1 shows a block diagram of a data processing system 100 and tables 102 and 104. The data processing system 100 has a microprocessor 108 and storage 110. The microprocessor 108 executes a computer program product 112 that is permanently stored on the storage 110 and loaded for execution into the microprocessor 108. The computer program product 112 comprises computer executable instructions which, when executed by the microprocessor 108, cause the data processing system 100 to generate a fingerprint 106 of a bit sequence 114 that is, according to this example, stored on the storage 110 and that might have been originally received as part of an email or that might relate to the complete bit sequence of the email.

The computer program product 112 is adapted to determine a set of bit combinations 116-136, wherein the set of bit combinations 116-136 comprises all possible non-redundant sub-sequences of bits having at least one bit and at most a preset maximal number of bits. Table 102 shows such a set of bit combinations 116-136 with non-redundant sub-sequences of bits having at least one bit and at most three bits. The set of bit combinations 116-136 might for example be stored on the storage 110 so that it can be further accessed by the microprocessor executing the computer program product 112.

The preset maximal number of bits therefore is according to this example set to 3. Each bit combination is given in a line of table 102. The set of bit combinations therefore comprises the bit combination 116: '1', the bit combination 118: '01', the bit combination 120: '10', the bit combination 122: '11', the bit combination 124: '001', the bit combination 126: '010', the bit combination 128: '011', the bit combination 130: '100', the bit combination 132: '101', the bit combination 134: '110', and the bit combination 136: '111'. The bit combinations '0', '00', and '000' are not present in the set of bit combinations 116-136 as they are redundant.

The computer program product 112 is further adapted to determine for each bit combination a relative occurrence frequency of the bit combination in the bit sequence 114. For example, the relative occurrence frequency 138 of the bit combination 116 in the bit sequence 114 is determined by counting the '1' bits in the bit sequence 114 and dividing the number by the total number of bits in the bit sequence 114. Similarly, the relative occurrence frequencies of the other bit combinations 118-136 are determined. The relative occurrence frequencies, such as the relative occurrence frequency 138, are stored on the storage 110 for further use.

Furthermore, for each bit combination, a random occurrence frequency that relates to the expected random occurrence of the bit combination in the bit sequence is determined. The probability that N bits of the bit sequence 114 will match one of the bit combinations 116-136 of corresponding length N is given by $P(N)=2^{-N}$, wherein N=1, 2, or 3 as according to this example, the bit combinations are 1, 2, or 3 bits long.

Furthermore, the computer program product 112 determines for each bit combination 116-136 a difference value between the relative occurrence frequency of the bit combination and a random occurrence frequency. For example, the computer program product 112 determines the difference value 140 for the bit combination 116 by determining the difference between the relative occurrence frequency 138 and $P(N=1)$.

The computer program product 112 is further adapted to allocate a set of bins 142-154, wherein each bin of the set of bins is associated with a pre-given interval of difference values and wherein each bin further relates to a bin value. Table 104 shows seven bins 142-154 that have been allocated by the computer program product 112, wherein bin 142 relates to the bin value of 0, wherein bin 144 relates to the bin value 1, wherein bin 146 relates to the bin value 2, wherein bin 148 relates to the bin value 3, wherein bin 150 relates to the bin value 4, wherein bin 152 relates to the bin value 5, and wherein bin 154 relates to the bin value 6.

Each of the bins 142 to 154 allows for encoding the difference values that have been determined with respect to the bit combinations 116-136. Therefore, each difference value is assigned to the bin that is associated with the interval of difference values in which the difference value of the corresponding bit combination lies. For example, for the bit combination 116, the difference value 140 is assumed to lie in the interval of difference values that is associated with the bin 146 and hence, the difference value 140 is allocated to the bin 146 as indicated by the cross in the table 104 at the line which matches the line in which the bit combination 116 is listed in the table 102. Correspondingly, the difference value determined for the bit combination 118 is assigned to the bin 142 that is associated with the bin value '0' as indicated by the corresponding cross in the corresponding line of table 104.

The procedure is carried out with respect to the remaining bit combinations 120-136 so that for each bit combination, the difference value is assigned to one of the bins 142-154 as indicated by the remaining crosses in table 104. As an example, the fingerprint 106 of the bit sequence is then generated by use of the bin values of the bins to which a difference value has been assigned. For example, the fingerprint 106 is taken to be the sequence of bin values that reflect the particular order of the bit combinations as listed in table 102. Thus, the fingerprint 106 corresponds to: 20143346654.

The storage 110 might also comprise a database 156. The database 156 comprises known fingerprints of bit sequences that have been determined before from the bit sequences in the same way as the fingerprint 106 is determined from the bit sequence 114. The fingerprint 106 can then be used to check the database 156 to determine whether it matches one of the fingerprints stored therein. If this is the case, then this is an indication that the bit sequence 114 matches at least approximately one of the previously analyzed bit sequences. If these bit sequences relate to, e.g., spam embedded images in email messages, then the bit sequence 114 can be identified as a spam embedded image in the event that there is a match.

Figure 2:
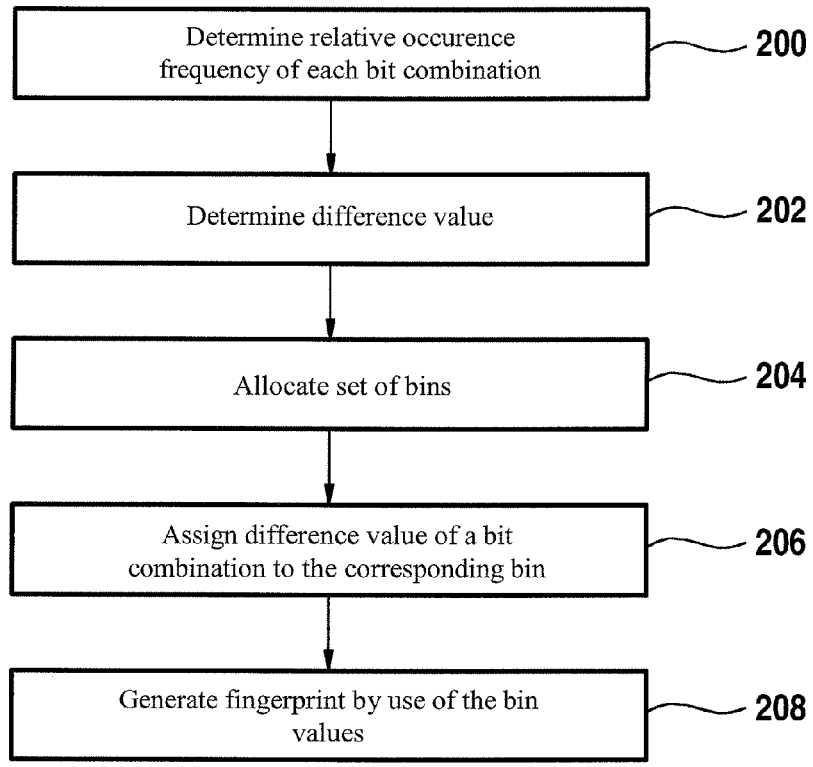
FIG. 2 shows a flow diagram illustrating steps of a method in accordance with the invention.

FIG. 2 shows a flow diagram that illustrates steps of a method in accordance with the invention. According to step 200, a relative occurrence frequency of each bit combination of a set of bit combinations in a bit sequence is determined, wherein the set of bit combinations comprises all possible non-redundant sub-sequences of bits having at least one bit and at most a preset maximal number of bits. According to step 202, a difference value is determined between the relative occurrence frequency of each bit combination of the set of bit combinations and a random occurrence frequency, wherein the random occurrence frequency relates to the expected random occurrence of the corresponding bit combination in the bit sequence. According to step 204, a set of bins is allocated, wherein each bin of the set of bins is associated with a pre-given interval of difference values, and wherein each bin further relates to a bin value. According to step 206, the difference value of each bit combination is assigned to the bin that is associated with the interval of difference values in which the difference value of the corresponding bit combination lies. Furthermore, according to step 208, a fingerprint of the bit sequence is generated by use of the bin values of the bins to which the difference value has been assigned.

Figure 3:
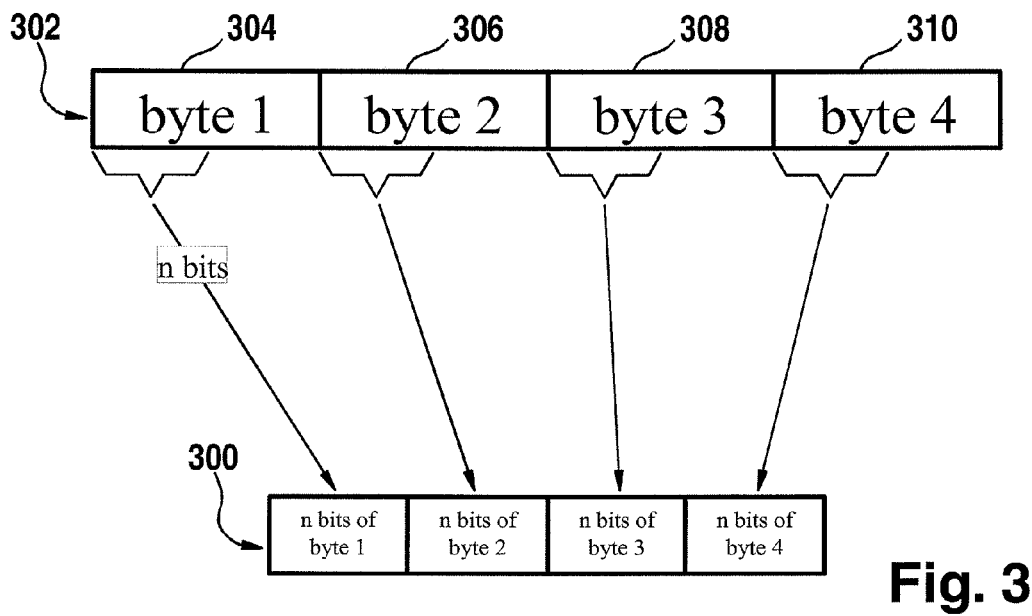
FIG. 3 provides an illustration showing how a bit sequence is determined from an input bit sequence.

FIG. 3 provides an illustration that shows how a bit sequence 300 for which a fingerprint is determined in accordance with a method in accordance with the invention is determined from an input bit sequence 302. The input bit sequence can for example relate to an email, and can be represented by a sequence of bytes 304, 306, 308, and 310. Each byte contains eight bits. The bit sequence 300 is determined according to an embodiment of the invention by taking the first n bits of each byte of the input bit sequence 302 and by concatenating the first n bits of the bytes so that the order is preserved. Thus, the first n bits taken from byte 306 are for example preceded by the first n bits taken from byte 304 and succeeded by the first n bits taken from byte 308 in the bit sequence 300.

Figure 4:
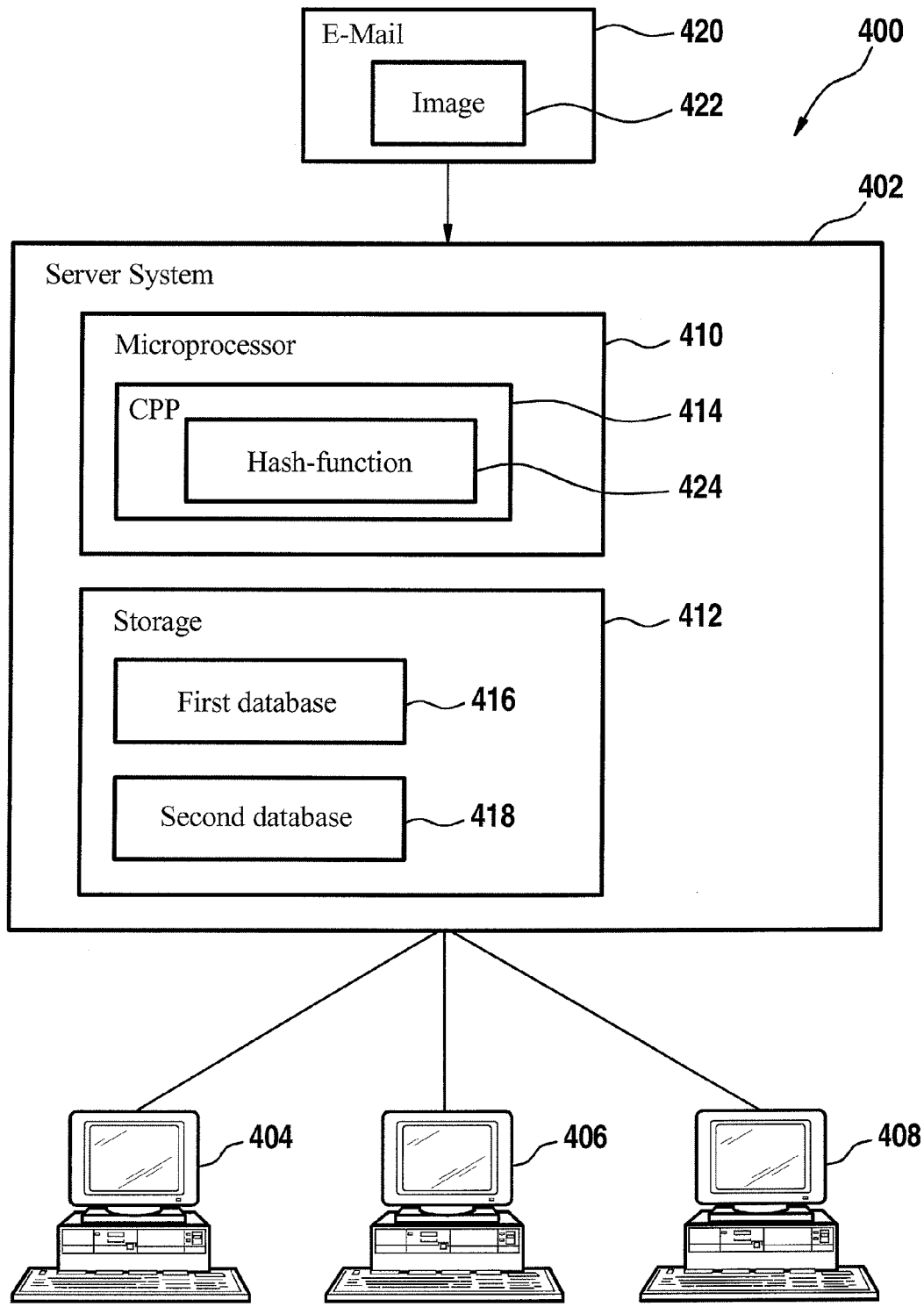
FIG. 4 shows a block diagram of a network having an email server and a plurality of clients.

FIG. 4 shows a block diagram of a network 400 comprising a server system 402 and client systems 404, 406, and 408. The server system 402 can be regarded as a data processing system that is adapted to perform the method in accordance with the invention. In particular, the server system 402 can be regarded as an email processing environment in which the method in accordance with the invention is employed to identify spam emails, in particular emails that comprise spam images.

The server system 402 has a microprocessor 410 and storage 412. The microprocessor 410 executes a computer program product 414 that is stored on the storage 412 and loaded for execution into the microprocessor 410. The storage 412 further comprises a first database 416 and a second database 418.

The server system 402 is adapted to receive emails, such as email 420, and to further distribute the emails to the clients 404-408. When an email, such as email 420 is received by the server system 402, the computer program product 414 is adapted to scan the email for embedded images. An embedded image 422 detected in the email 420 is extracted. The embedded image 422 might be provided in a first file format. The computer program product 414 accesses the first database 416 which comprises information whether an embedded image in the first file format can be used directly in order to determine a fingerprint with respect to the embedded image 422 or whether the embedded image 422 in the first file format must be transformed into a second file format prior to the determination of the fingerprint with respect to the embedded image 422. In case it is indicated by the information of the first database 416 that the embedded image 422 in the first file format should be transformed into a second file format, the computer program product 414 transforms the embedded image 422 into the second file format and employs the bit sequence relating to the transformed embedded image for determining the fingerprint of the embedded image. The fingerprint can be further used as input value for a hash function 424 implemented in the computer program product 414, wherein so determined hash value relates to an identifier of the embedded image 422.

The second database 418 comprises fingerprints or identifiers of bit sequences that relate to spam images. These fingerprints or identifiers have been determined in advance in the same way as the fingerprint and/or identifier of the embedded image 422 are determined.

The fingerprint or identifier determined from the embedded image 422 is then compared with the fingerprints or identifiers that are comprised in the second database 418. If, e.g., the fingerprint of the embedded image 422 matches with one of the fingerprints of the second database 418, then the embedded image 422 is identified as a spam image and the email 420 that comprises the embedded image 422 is blocked. Thus, the email 422 is not distributed to one of the clients 404-408.

Figure 5:
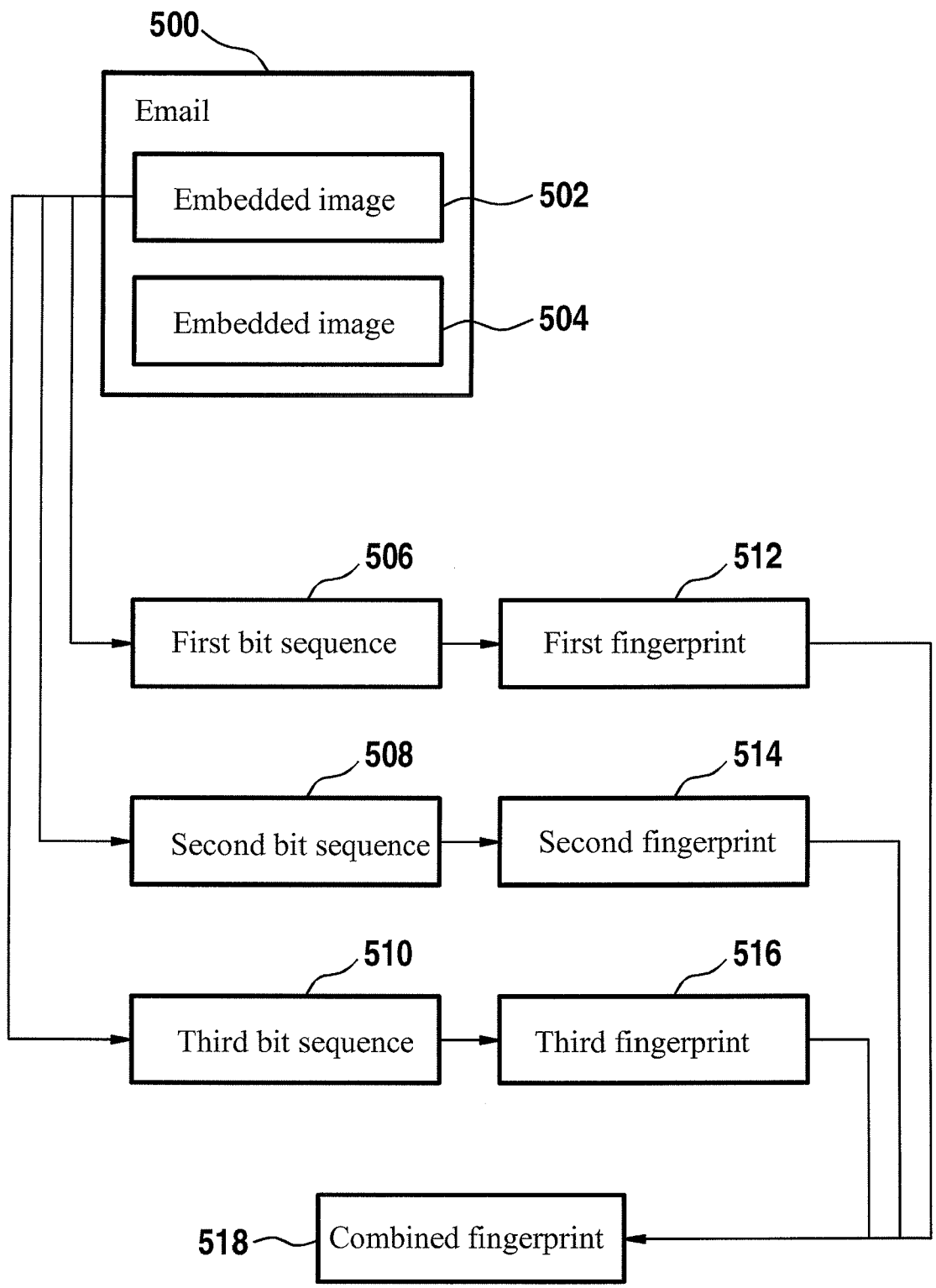
FIG. 5 shows a block diagram of an email and illustrates how fingerprints of embedded images are determined.

FIG. 5 shows a block diagram of an email 500 which comprises a first embedded image 502 as well as a second embedded image 504. Each of the embedded images 502 and 504 are processed separately in order to determine a fingerprint for each of the embedded images 502 and 504. In particular, each embedded image 502 and 504 is analyzed with respect to its file format and if an embedded image is not given in the RGB format, it is transformed into the RGB format.

With respect to the first embedded image 502, a first bit sequence 506 is then determined from the embedded image 502 which comprises the red channel data according to the RGB format of the first embedded image 502. Further, a second bit sequence 508 is determined from the first embedded image which comprises the green channel data according to the RGB format of the corresponding embedded image. Moreover, a third bit sequence 510 is determined from the first embedded image which comprises the blue channel data according to the RGB format of the corresponding embedded image 502.

Then, a first fingerprint 512 is determined from the first bit sequence 506. A second fingerprint 514 is determined from the second bit sequence 508, and a third fingerprint 516 is determined from the third bit sequence 510.

A combined fingerprint 518 is then determined by concatenating the first, second and third fingerprints 512, 514 and 516. The concatenated fingerprint 518 is used for a comparison with fingerprints held in a database. These fingerprints have also been determined by a concatenation of the three fingerprints that have been determined separately from the three different color channel data according to the RGB format provided of spam images.

Similarly, the combined fingerprint is determined from the second embedded image 504 of the email. The email 500 is only further made available to receiving clients, as for example the clients 404-408 of FIG. 4, if none of the so determined combined fingerprints match fingerprints in a database that holds the fingerprints of spam images.

Figure 6:
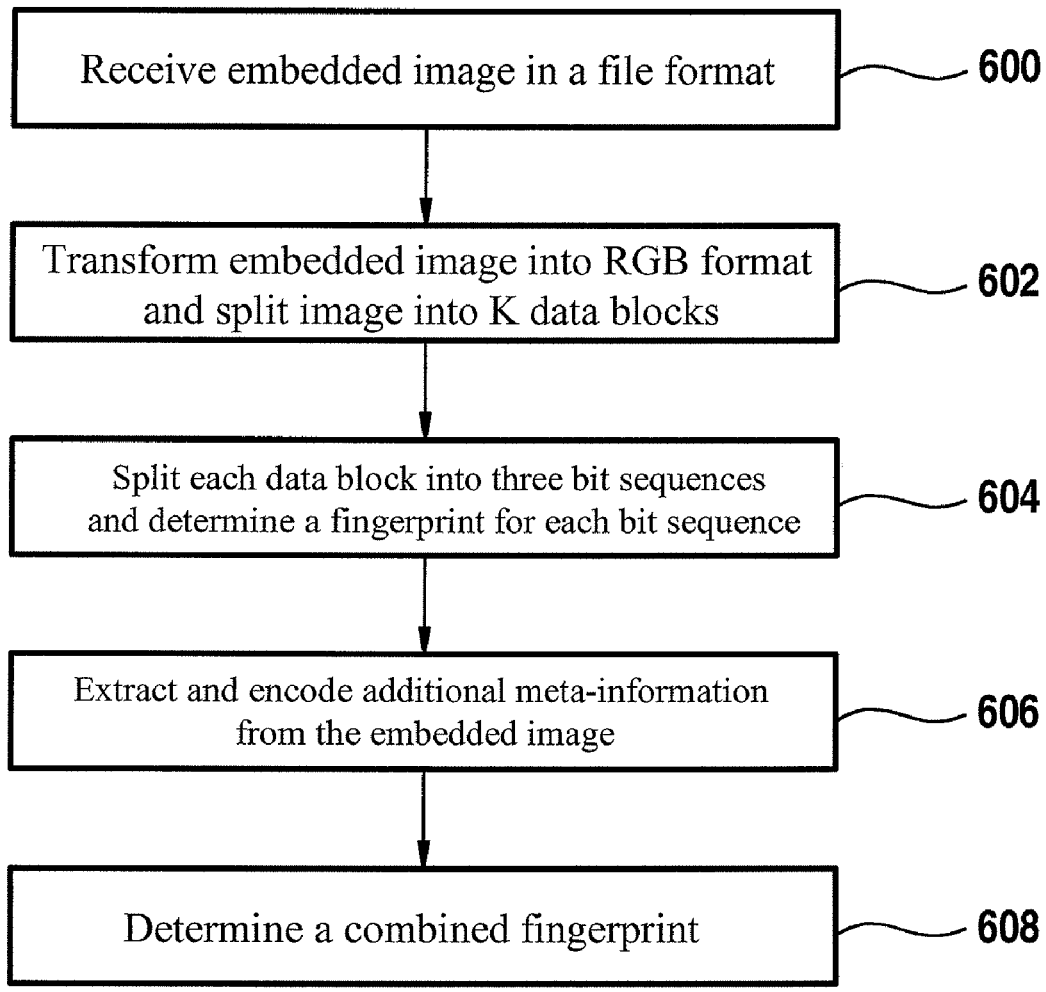
FIG. 6 shows a flow diagram illustrating steps of a method in accordance with the invention.

FIG. 6 shows another flow diagram illustrating steps performed by a method in accordance with the invention. According to step 600, an embedded image in a file format, e.g., PNG or JPEG, is received. The embedded image is then according to step 602 transformed into the RGB format and split into K data blocks. According to step 604, each data block is split into three bit sequences, wherein one bit sequence relates to the red channel data of the data block of the embedded image, wherein another bit sequence relates to the green channel data of the data block, and wherein a further bit sequence relates to the blue channel data according to the RGB format of the corresponding data block. For each sequence, a fingerprint is determined as described before which yields 3×K fingerprints. According to step 606, additional meta-information is extracted and encoded from the embedded image, wherein the meta-information relates for example to the aspect ratio of the embedded image. According to step 608, a combined fingerprint is determined from the 3×K fingerprints, wherein the meta-information is further employed for the determination of the combined fingerprint.

Figure 7:
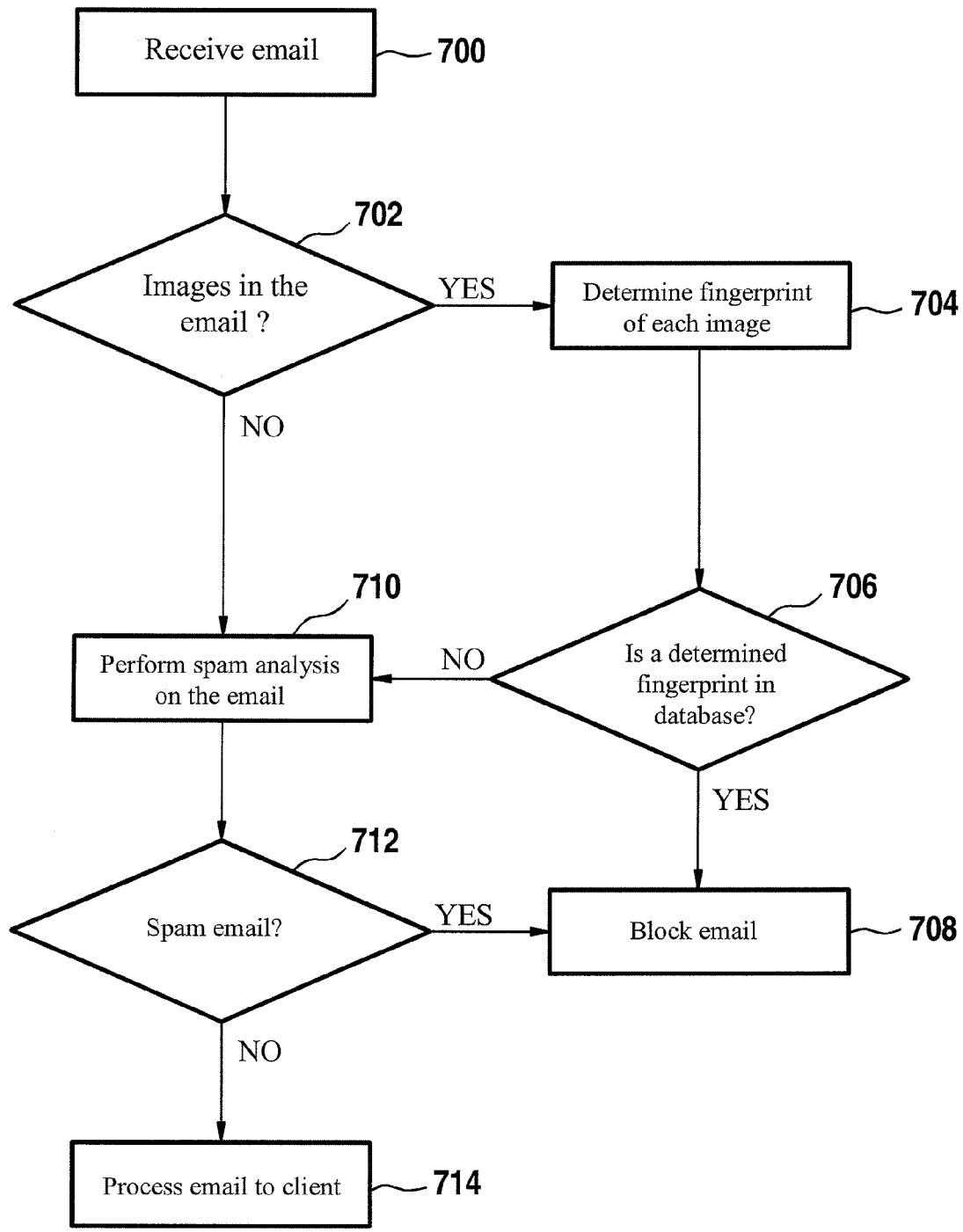
FIG. 7 shows a flow diagram illustrating steps of a method in accordance with the invention.

FIG. 7 shows a flow diagram illustrating steps of a method in accordance with the invention. The method starts with step 700, wherein an email is received. In step 702, it is determined if the email contains embedded images that are extracted from the email. If the email contains embedded images, the method proceeds with step 704, wherein a fingerprint is determined as described before for each embedded image. In step 706, each determined fingerprint is compared with fingerprints held in a database that relate to spam images. If any of the determined fingerprints matches with a fingerprint in the database, the method proceeds with step 708, wherein the received email is blocked. The method then also ends with step 708.

If it is determined in step 702 that the email does not contain any embedded images, the method proceeds with step 710, wherein further spam analysis is performed on the received email. Step 710 is also executed after step 706, if it turns out that none of the determined fingerprints match a fingerprint in the database. Step 710 is succeeded by step 712, where it is determined, if the email is a spam email and if it turns out that the email is detected as spam, the method flows to step 708, wherein the email is blocked. Otherwise the method continues with step 714, wherein the email is further processed to the receiving client.

It is appreciated that the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk -read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A method of generating a fingerprint of a bit sequence comprising:
   determining a maximal number of bits for a set of bit combinations from the bit sequence, wherein said set of bit combinations comprises all possible non-redundant sub-sequences of bits having at least one bit and at most said maximal number of bits;
   determining a relative occurrence frequency of each bit combination of said set of bit combinations;
   determining for each bit combination of the set of bit combinations a difference value between the relative occurrence frequency of the bit combination and a random occurrence frequency, the random occurrence frequency relating to the expected random occurrence of the bit combination in the bit sequence;
   allocating a set of bins, each bin of the set of bins being associated with a predetermined interval of difference values, each bin further relating to a bin value;
   assigning the difference value of each bit combination to the bin which is associated with the interval of difference values in which the difference value of the corresponding bit combination lies;
   generating the fingerprint of the bit sequence by use of the bin values of the bins to which a difference value has been assigned.

2. The method according to claim 1, further comprising:
   determining a particular order for the bit combinations of the set of bit combinations, wherein the bin values reflect the particular order of the bit combinations in the fingerprint.

3. The method according to claim 2, further comprising:
   receiving an input bit sequence;
   determining the bit sequence from the input bit sequence, wherein the bit sequence is a sub-sequence of the input bit sequence.

4. The method according to claim 3, wherein the input bit sequence relates to a sequence of bytes, wherein the bit sequence comprises the first n bits of each byte of the sequence of bytes, wherein the first n bits of a first byte of the sequence of bytes are preceded by the first n bits of the byte preceding the first byte and succeeded by the first n bits of the bytes succeeding the first byte in the sequence of bytes, and wherein n is a predetermined number between one and eight, inclusively.

5. The method according to claim 4, further comprising determining an identifier from the fingerprint, wherein the identifier relates to the hash value of a hash function applied to the fingerprint.

6. The method according to claim 5, wherein the input bit sequence is received in a first file format, the method further comprising:
accessing a first database, the first database comprising information as to whether the input bit sequence in the first file format is to be transformed into a second file format for determining the fingerprint of the input bit sequence;
transforming the input sequence from the first file format into the second file format if specified in the first database.

7. The method according to claim 6, further comprising:
scanning the input bit sequence for meta-data; and
using the meta-data for generating the fingerprint.

8. The method according to claim 7, further comprising:
receiving an email;
scanning the email for embedded images, wherein each embedded image relates to an input bit sequence, wherein a bit sequence is determined for each input bit sequence; and
determining the fingerprint of each bit sequence.

9. The method according to claim 8, further comprising:
accessing a second database, wherein the second database comprises fingerprints of bit sequences determined from input bit sequences relating to spam images;
comparing each fingerprint of a bit sequence relating to an embedded image in the email with the fingerprints of the second database;
blocking the email if a fingerprint of a bit sequence relating to an embedded image in the email matches a fingerprint in the second database.

10. The method according to claim 9, further comprising:
transforming each embedded image of the email into the RGB format;
determining a first bit sequence from each embedded image, the first bit sequence comprising the red channel data according to the RGB format of the corresponding embedded image;
determining a second bit sequence from each embedded image, the second bit sequence comprising the green channel data according to the RGB format of the corresponding embedded image;
determining a third bit sequence from each embedded image, the third bit sequence comprising the blue channel data according to the RGB format of the corresponding embedded image;
determining a first fingerprint of the first bit sequence, a second fingerprint of the second bit sequence, and a third fingerprint of the third bit sequence;
determining a combined fingerprint by concatenating the first, second, and third fingerprints, wherein the combined fingerprint is compared with the fingerprints of the second database.

11. The method according to claim 10, wherein the first, second and third bit sequences are determined from a part of the embedded image, wherein the part is obtained by splitting the corresponding embedded image into a plurality of blocks.

12. A computer program product for generating a fingerprint of a bit sequence, the computer program product comprising a non-transitory computer useable medium including a computer readable program, wherein the computer readable program when executed on a computer causes the computer to:
determine a maximal number of bits for a set of bit combinations from the bit sequence, wherein said set of bit combinations comprises all possible non-redundant sub-sequences of bits having at least one bit and at most said maximal number of bits;
determine a relative occurrence frequency of each bit combination of said set of bit combinations;
determine for each bit combination of the set of bit combinations a difference value between the relative occurrence frequency of the bit combination and a random occurrence frequency, the random occurrence frequency relating to the expected random occurrence of the bit combination in the bit sequence;
allocate a set of bins, each bin of the set of bins being associated with a pregiven interval of difference values, each bin further relating to a bin value;
assign the difference value of each bit combination to the bin which is associated with the interval of difference values in which the difference value of the corresponding bit combination lies;
generate the fingerprint of the bit sequence by use of the bin values of the bins to which a difference value has been assigned.

13. A data processing system comprising:
a non-transitory computer useable medium including a computer readable program for generating a fingerprint of a bit sequence, wherein the computer program comprises:
a component determining a maximal number of bits for a set of bit combinations from the bit sequence, wherein said set of bit combinations comprises all possible non-redundant sub-sequences of bits having at least one bit and at most said maximal number of bits;
a component determining a relative occurrence frequency of each bit combination of said set of bit combinations;
a component determining for each bit combination of the set of bit combinations a difference value between the relative occurrence frequency of the bit combination and a random occurrence frequency, the random occurrence frequency relating to the expected random occurrence of the bit combination in the bit sequence;
a component allocating a set of bins, each bin of the set of bins being associated with a predetermined interval of difference values, each bin further relating to a bin value;
a component assigning the difference value of each bit combination to the bin which is associated with the interval of difference values in which the difference value of the corresponding bit combination lies;
a generator generating the fingerprint of the bit sequence by use of the bin values of the bins to which a difference value has been assigned.

14. The data processing system according to claim 13, further comprising:
a receiver receiving an input bit sequence;
a component determining the bit sequence from the input bit sequence, wherein the bit sequence is a sub-sequence of the input bit sequence.

15. The data processing system according to claim 14, further comprising:
a generator generating a sequence of bin values, wherein the sequence of bin values comprises the bin values of the bins to which a difference value has been assigned;

a component determining the fingerprint by applying a hash function to the sequence of bin values.

16. The data processing system according to claim 15, further comprising:
a receiver receiving an email;
a component scanning the email for embedded images, wherein each embedded image relates to an input bit sequence, wherein a bit sequence is determined for each input bit sequence.

17. The data processing system according to claim 16, further comprising:
a component accessing a second database, wherein the second database comprises fingerprints of bit sequences determined from input bit sequences relating to spam images;
a component comparing each fingerprint of a bit sequence relating to an embedded image in the email with the fingerprints of the second database;
a component blocking the email if a fingerprint of a bit sequence relating to an embedded image in the email matches a fingerprint in the second database.

18. A network comprising at least an email server and a plurality of email clients, wherein the email server is adapted to forward received emails to one or more client of the plurality of clients, wherein the email server comprises a data processing system according to claim 17 for scanning received emails for spam images.

* * * * *